(12) United States Patent
Chang et al.

(10) Patent No.: US 12,348,153 B2
(45) Date of Patent: Jul. 1, 2025

(54) HIGH EFFICIENCY CHARGING SYSTEM AND POWER CONVERSION CIRCUIT THEREOF

(71) Applicant: Richtek Technology Corporation, Zhubei (TW)

(72) Inventors: Wei-Hsu Chang, Hsinchu (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 716 days.

(21) Appl. No.: 17/531,792

(22) Filed: Nov. 21, 2021

(65) Prior Publication Data

US 2022/0166339 A1 May 26, 2022

Related U.S. Application Data

(60) Provisional application No. 63/117,425, filed on Nov. 23, 2020.

(30) Foreign Application Priority Data

May 4, 2021 (TW) .................................. 110116101

(51) Int. Cl.
 *H02M 1/00* (2007.01)
 *H02J 7/00* (2006.01)
 (Continued)

(52) U.S. Cl.
 CPC ........... *H02M 7/05* (2021.05); *H02J 7/00712* (2020.01); *H02J 7/02* (2013.01); *H02M 1/0032* (2021.05);
 (Continued)

(58) Field of Classification Search
 CPC .. H02M 1/0032; H02M 1/007; H02M 3/1584; H02M 3/07; H02M 1/0095;
 (Continued)

(56) References Cited

U.S. PATENT DOCUMENTS

| 4,347,474 A | * | 8/1982 | Brooks | ............... H02M 3/1582 323/224 |
| 7,394,673 B2 | * | 7/2008 | Oyama | ................... H02M 3/07 363/59 |

(Continued)

FOREIGN PATENT DOCUMENTS

| CN | 115882547 A | * | 3/2023 | .......... H02M 3/1582 |
| KR | 20190017300 A | * | 2/2019 | |

OTHER PUBLICATIONS

Properties_of_the_Charge-Pump_Voltage_Splitter__Analog_Devices (Year: 2001).*

(Continued)

*Primary Examiner* — John T Trischler
(74) *Attorney, Agent, or Firm* — Tung & Associates

(57) ABSTRACT

A power conversion circuit includes an inductive switching power converter and a capacitive switching power converter. The inductive switching power converter switches an inductor to converter a DC power to a first power. The capacitive switching power converter switches a conversion capacitor to convert the first power to a charging power for charging a battery. The inductive switching power converter and the capacitive switching power converter flexibly operate in and dynamically switch between a regulation mode, a bypass mode or a combination thereof according to a parameter of the DC power.

11 Claims, 10 Drawing Sheets

(51) Int. Cl.
*H02J 7/02* (2016.01)
*H02M 3/07* (2006.01)
*H02M 3/158* (2006.01)
*H02M 7/04* (2006.01)

(52) U.S. Cl.
CPC .............. *H02M 1/007* (2021.05); *H02M 3/07* (2013.01); *H02M 3/158* (2013.01); *H02J 7/007182* (2020.01); *H02J 2207/20* (2020.01)

(58) Field of Classification Search
CPC ...... H02M 3/158; H02M 7/05; H02J 7/00712; H02J 7/02; H02J 2207/20
USPC .......................................................... 320/107
See application file for complete search history.

(56) References Cited

U.S. PATENT DOCUMENTS

| | | | | |
|---|---|---|---|---|
| 7,777,459 | B2 * | 8/2010 | Williams | H02M 1/0095 323/266 |
| 7,782,027 | B2 * | 8/2010 | Williams | H02M 3/07 363/60 |
| 7,786,712 | B2 * | 8/2010 | Williams | H02M 3/1588 363/60 |
| 7,812,579 | B2 * | 10/2010 | Williams | H02M 3/07 363/60 |
| 7,990,070 | B2 * | 8/2011 | Nerone | H02M 1/32 315/308 |
| 8,072,786 | B2 * | 12/2011 | Lu | H02M 1/4208 323/268 |
| 8,089,253 | B2 * | 1/2012 | Murtojarvi | H03F 3/21 323/224 |
| 8,134,848 | B2 * | 3/2012 | Whittam | H02M 7/217 363/84 |
| 8,164,932 | B2 * | 4/2012 | Sims | H02M 7/02 363/69 |
| 8,174,856 | B2 * | 5/2012 | Chapman | H02M 7/003 363/101 |
| 8,193,788 | B2 * | 6/2012 | Chapman | H02M 3/155 323/906 |
| 8,212,541 | B2 * | 7/2012 | Perreault | H02M 3/07 323/285 |
| 8,427,113 | B2 * | 4/2013 | Xing | H02J 7/007182 320/140 |
| 8,456,876 | B2 * | 6/2013 | Chapman | H01F 38/14 363/65 |
| 8,461,813 | B2 * | 6/2013 | Chapman | H02M 7/003 363/65 |
| 8,488,340 | B2 * | 7/2013 | Zhang | H02M 3/3376 363/21.07 |
| 8,492,928 | B2 * | 7/2013 | Pyboyina | H02J 9/062 307/64 |
| 8,493,141 | B2 * | 7/2013 | Khlat | H03F 3/24 330/297 |
| 8,519,788 | B2 * | 8/2013 | Khlat | H03F 3/24 330/297 |
| 8,599,587 | B2 * | 12/2013 | Chapman | H02M 3/155 323/906 |
| 8,633,766 | B2 * | 1/2014 | Khlat | H02M 3/07 330/297 |
| 8,643,347 | B2 * | 2/2014 | Giuliano | H02M 3/155 323/266 |
| 8,687,392 | B2 * | 4/2014 | Sims | H02M 7/02 363/69 |
| 8,699,248 | B2 * | 4/2014 | Giuliano | H02M 3/158 363/59 |
| 8,716,987 | B2 * | 5/2014 | Pauritsch | H05B 45/38 323/288 |
| 8,786,264 | B2 * | 7/2014 | Muhammad | H02M 3/1584 323/272 |
| 8,854,019 | B1 * | 10/2014 | Levesque | H02M 1/14 363/60 |
| 8,971,073 | B2 * | 3/2015 | Grant | G05F 1/56 363/65 |
| 9,048,727 | B2 * | 6/2015 | Giuliano | H02M 3/158 |
| 9,136,756 | B2 * | 9/2015 | Liu | H02M 3/07 |
| 9,197,165 | B2 * | 11/2015 | Khlat | H03F 1/0244 |
| 9,263,183 | B2 * | 2/2016 | Chapman | H02S 40/32 |
| 9,356,508 | B2 * | 5/2016 | Wang | H02M 3/156 |
| 9,374,020 | B2 * | 6/2016 | Perreault | H01G 4/38 |
| 9,379,618 | B2 * | 6/2016 | Freeman | H02M 3/158 |
| 9,461,546 | B2 * | 10/2016 | Freeman | H02M 3/158 |
| 9,484,804 | B2 * | 11/2016 | Seong | H02M 1/4208 |
| 9,484,807 | B2 * | 11/2016 | Petrovic | H02M 3/07 |
| 9,595,871 | B1 * | 3/2017 | Bayer | H02M 3/1582 |
| 9,621,113 | B2 * | 4/2017 | Khlat | H03F 1/0244 |
| 9,667,139 | B2 * | 5/2017 | Giuliano | H02M 3/158 |
| 9,729,065 | B2 * | 8/2017 | Freeman | H01R 31/065 |
| 9,742,266 | B2 * | 8/2017 | Giuliano | H02M 3/07 |
| 9,762,145 | B2 * | 9/2017 | Perreault | H02M 7/537 |
| 9,780,661 | B2 * | 10/2017 | Chakraborty | H02M 3/158 |
| 9,853,542 | B2 * | 12/2017 | Wang | H02M 1/08 |
| 9,882,471 | B2 * | 1/2018 | Giuliano | H02M 3/07 |
| 9,893,628 | B2 * | 2/2018 | Yang | H02M 3/33592 |
| 9,906,189 | B2 * | 2/2018 | Ben-Yaakov | H02M 3/07 |
| 9,917,510 | B2 * | 3/2018 | Ahmed | H02M 3/07 |
| 9,942,956 | B1 * | 4/2018 | Chen | H05B 45/397 |
| 10,014,823 | B2 * | 7/2018 | Ben-Yaakov | H02M 3/01 |
| 10,027,223 | B1 * | 7/2018 | Zhang | H02M 3/07 |
| 10,079,541 | B1 * | 9/2018 | Taban | H02M 3/33546 |
| 10,084,384 | B1 * | 9/2018 | Kotikalapoodi | H02M 3/158 |
| 10,177,588 | B2 * | 1/2019 | Huang | H02M 3/07 |
| 10,218,289 | B2 * | 2/2019 | Perreault | H01G 4/30 |
| 10,263,514 | B1 * | 4/2019 | Aboueldahab | H02M 3/1582 |
| 10,284,090 | B2 * | 5/2019 | Azrai | H02M 3/07 |
| 10,312,798 | B2 * | 6/2019 | Green | H02M 1/4225 |
| 10,348,221 | B1 * | 7/2019 | Wolfe | H02P 3/14 |
| 10,381,924 | B2 * | 8/2019 | Giuliano | H02M 3/07 |
| 10,389,235 | B2 * | 8/2019 | Giuliano | H02M 3/1582 |
| 10,404,162 | B2 * | 9/2019 | Giuliano | H02M 7/25 |
| 10,523,032 | B2 * | 12/2019 | Huang | H02J 50/10 |
| 10,541,611 | B2 * | 1/2020 | Giuliano | H02M 3/07 |
| 10,587,189 | B1 * | 3/2020 | Ausseresse | H02M 3/073 |
| 10,587,206 | B1 * | 3/2020 | Xiao | H02M 7/217 |
| 10,594,210 | B1 * | 3/2020 | Mercer | H03K 17/063 |
| 10,601,304 | B2 * | 3/2020 | McRae | H02M 3/07 |
| 10,608,539 | B1 * | 3/2020 | Huang | H02J 1/102 |
| 10,624,165 | B1 * | 4/2020 | Borghetti | H02M 3/1582 |
| 10,680,515 | B2 * | 6/2020 | Giuliano | H02M 3/07 |
| 10,686,367 | B1 * | 6/2020 | Low | H02M 1/36 |
| 10,686,378 | B2 * | 6/2020 | Dai | H02M 3/33507 |
| 10,686,381 | B1 * | 6/2020 | Zhang | H02M 3/1588 |
| 10,720,833 | B2 * | 7/2020 | Tsuda | H02M 3/073 |
| 10,749,434 | B2 * | 8/2020 | Giuliano | H02M 3/07 |
| 10,770,966 | B2 * | 9/2020 | Marcinkiewicz | H02M 1/44 |
| 10,790,742 | B1 * | 9/2020 | Petersen | H02M 3/07 |
| 10,790,766 | B2 * | 9/2020 | Wolfe | H02P 7/292 |
| 10,797,500 | B2 * | 10/2020 | Huang | H02J 7/0024 |
| 10,833,587 | B1 * | 11/2020 | Chen | H02M 3/158 |
| 10,862,393 | B2 * | 12/2020 | Tsuda | H02M 3/07 |
| 10,868,429 | B2 * | 12/2020 | Li | H02M 3/07 |
| 10,992,167 | B2 * | 4/2021 | Shinohara | H02J 13/00009 |
| 11,005,366 | B2 * | 5/2021 | Huang | H02M 3/158 |
| 11,011,978 | B2 * | 5/2021 | McRae | H02M 3/07 |
| 11,038,420 | B2 * | 6/2021 | Mercer | H02M 1/36 |
| 11,043,831 | B2 * | 6/2021 | Kominami | B60L 53/10 |
| 11,063,512 | B1 * | 7/2021 | Hsiao | H02M 1/007 |
| 11,063,515 | B2 * | 7/2021 | Huang | H02M 3/07 |
| 11,075,576 | B2 * | 7/2021 | Low | H02M 3/07 |
| 11,101,674 | B2 * | 8/2021 | Walley | H02J 7/00 |
| 11,165,338 | B2 * | 11/2021 | Dai | H02M 7/797 |
| 11,201,493 | B2 * | 12/2021 | Eftimie | H02M 3/158 |
| 11,211,861 | B2 * | 12/2021 | Giuliano | H02M 7/25 |
| 11,245,330 | B2 * | 2/2022 | Giuliano | H02M 3/155 |
| 11,251,708 | B2 * | 2/2022 | Park | H02M 3/07 |
| 11,258,371 | B2 * | 2/2022 | Giuliano | H02M 1/4208 |
| 11,296,597 | B1 * | 4/2022 | Puggelli | G11C 5/145 |
| 11,303,205 | B2 * | 4/2022 | Giuliano | H02M 3/07 |
| 11,309,716 | B2 * | 4/2022 | Li | H02M 7/219 |
| 11,316,424 | B2 * | 4/2022 | Giuliano | H02M 3/07 |
| 11,368,086 | B2 * | 6/2022 | Aboueldahab | H02M 3/1582 |

(56) References Cited

U.S. PATENT DOCUMENTS

| | | | | |
|---|---|---|---|---|
| 11,381,162 B2* | 7/2022 | Nogawa | H02M 1/14 |
| 11,411,493 B2* | 8/2022 | Liu | G06F 1/26 |
| 11,469,661 B2* | 10/2022 | King | H02J 7/0063 |
| 11,476,766 B2* | 10/2022 | Lawrence | H02M 3/1566 |
| 11,505,075 B2* | 11/2022 | Lee | B60L 50/70 |
| 11,545,896 B1* | 1/2023 | Zhang | H02J 7/0063 |
| 11,552,547 B2* | 1/2023 | Liu | H02M 1/0058 |
| 11,552,569 B2* | 1/2023 | Mackay | H02M 3/1586 |
| 11,563,337 B2* | 1/2023 | Yuan | H02J 50/12 |
| 11,594,957 B2* | 2/2023 | Matei | H02M 1/007 |
| 11,601,048 B2* | 3/2023 | Liu | H02M 3/01 |
| 11,616,434 B2* | 3/2023 | King | H02M 3/1584 320/134 |
| 11,637,531 B1* | 4/2023 | Perreault | H03F 1/0227 330/297 |
| 11,646,654 B2* | 5/2023 | Liu | H02M 3/01 323/282 |
| 11,658,559 B2* | 5/2023 | Mackay | H02M 3/156 323/259 |
| 11,664,727 B2* | 5/2023 | Giuliano | H02M 3/07 323/267 |
| 11,671,002 B2* | 6/2023 | Liu | H02M 3/07 323/272 |
| 11,671,004 B2* | 6/2023 | Low | H02M 3/158 323/290 |
| 11,682,966 B2* | 6/2023 | Liu | H02M 3/01 323/282 |
| 11,716,020 B2* | 8/2023 | Liu | H02M 3/01 323/271 |
| 11,736,010 B2* | 8/2023 | Giuliano | H02M 3/155 323/282 |
| 11,742,751 B2* | 8/2023 | Liu | H02M 3/07 323/271 |
| 11,764,670 B2* | 9/2023 | Giuliano | H02M 3/07 363/60 |
| 11,770,064 B2* | 9/2023 | Lawrence | H02M 3/1566 323/259 |
| 11,791,723 B2* | 10/2023 | Giuliano | H02M 3/07 363/60 |
| 11,811,319 B2* | 11/2023 | Huang | H02M 3/06 |
| 11,831,236 B2* | 11/2023 | Dai | H02M 7/797 |
| 11,855,531 B2* | 12/2023 | Lim | H02M 3/07 |
| 11,876,443 B2* | 1/2024 | Huang | H02M 1/0003 |
| 11,949,332 B2* | 4/2024 | Lim | H02M 3/158 |
| 11,949,383 B1* | 4/2024 | Perreault | H03F 3/245 |
| 11,955,884 B2* | 4/2024 | Liu | H02M 3/01 |
| 11,967,895 B2* | 4/2024 | Li | H02J 7/00 |
| 12,003,173 B2* | 6/2024 | Khlat | H02M 3/07 |
| 12,027,903 B2* | 7/2024 | Yang | H02M 3/1584 |
| 12,046,986 B2* | 7/2024 | Lawrence | H02M 1/0035 |
| 12,062,974 B2* | 8/2024 | Yang | H02M 3/07 |
| 12,101,020 B2* | 9/2024 | Huang | H02M 3/1582 |
| 12,107,495 B2* | 10/2024 | Giuliano | H02M 3/07 |
| 12,113,395 B2* | 10/2024 | Tajima | H02M 5/4585 |
| 12,136,875 B2* | 11/2024 | Liu | H02M 3/158 |
| 12,136,876 B2* | 11/2024 | Liu | H02M 3/158 |
| 12,136,877 B2* | 11/2024 | Liu | H02M 1/0009 |
| 12,143,002 B2* | 11/2024 | Lin | H02M 1/009 |
| 12,155,299 B2* | 11/2024 | Lim | H02M 3/1586 |
| 2007/0091655 A1* | 4/2007 | Oyama | H02M 3/07 363/59 |
| 2008/0157732 A1* | 7/2008 | Williams | H02M 3/07 323/266 |
| 2008/0157733 A1* | 7/2008 | Williams | H02M 3/1588 363/21.01 |
| 2008/0158915 A1* | 7/2008 | Williams | H02M 3/07 363/21.06 |
| 2008/0278136 A1* | 11/2008 | Murtojarvi | H02M 3/156 323/299 |
| 2009/0033289 A1* | 2/2009 | Xing | H02J 7/007182 320/140 |
| 2009/0059630 A1* | 3/2009 | Williams | H02M 3/1588 363/60 |
| 2009/0167260 A1* | 7/2009 | Pauritsch | H02J 7/345 323/233 |
| 2009/0278520 A1* | 11/2009 | Perreault | H02M 3/07 323/282 |
| 2010/0202161 A1* | 8/2010 | Sims | H02M 7/02 363/20 |
| 2010/0246229 A1* | 9/2010 | Lu | H02M 1/4208 363/127 |
| 2010/0308751 A1* | 12/2010 | Nerone | H02M 1/32 315/312 |
| 2011/0038189 A1* | 2/2011 | Whittam | H02J 1/00 363/84 |
| 2011/0227418 A1* | 9/2011 | Pyboyina | H02J 9/062 307/75 |
| 2011/0267855 A1* | 11/2011 | Chapman | H02M 3/155 363/74 |
| 2011/0267858 A1* | 11/2011 | Chapman | H02M 7/44 363/101 |
| 2011/0267859 A1* | 11/2011 | Chapman | H02M 7/44 363/101 |
| 2012/0051097 A1* | 3/2012 | Zhang | H02M 3/3376 363/21.07 |
| 2012/0075894 A1* | 3/2012 | Chapman | H02M 3/158 363/101 |
| 2012/0176823 A1* | 7/2012 | Sims | H02M 7/02 363/69 |
| 2012/0212293 A1* | 8/2012 | Khlat | H03F 3/24 330/127 |
| 2012/0293253 A1* | 11/2012 | Khlat | H03F 3/24 330/127 |
| 2012/0313602 A1* | 12/2012 | Perreault | H02M 3/07 323/282 |
| 2012/0313701 A1* | 12/2012 | Khlat | H02M 3/07 330/127 |
| 2012/0326684 A1* | 12/2012 | Perreault | H02M 3/158 323/282 |
| 2013/0016544 A1* | 1/2013 | Chapman | H02M 7/44 363/101 |
| 2013/0069614 A1 | 3/2013 | Tso et al. | |
| 2013/0176011 A1* | 7/2013 | Muhammad | H02M 3/1584 323/283 |
| 2013/0234686 A1* | 9/2013 | Grant | H02M 3/28 323/282 |
| 2013/0307617 A1* | 11/2013 | Khlat | H03F 3/21 330/127 |
| 2014/0084702 A1* | 3/2014 | Chapman | H02M 7/003 307/104 |
| 2014/0225581 A1* | 8/2014 | Giuliano | H02M 3/07 323/282 |
| 2014/0239930 A1* | 8/2014 | Wang | H02M 3/156 323/284 |
| 2014/0268946 A1* | 9/2014 | Liu | H02M 3/07 363/60 |
| 2014/0313781 A1* | 10/2014 | Perreault | H01G 4/38 363/13 |
| 2014/0339918 A1* | 11/2014 | Perreault | H02M 7/217 307/109 |
| 2014/0355322 A1* | 12/2014 | Perreault | H01G 4/30 363/131 |
| 2015/0028839 A1* | 1/2015 | Petrovic | H02M 3/07 323/311 |
| 2015/0036389 A1* | 2/2015 | Freeman | H02M 1/36 363/16 |
| 2015/0077175 A1* | 3/2015 | Giuliano | H02M 3/07 327/536 |
| 2015/0155789 A1* | 6/2015 | Freeman | H02M 3/33592 363/16 |
| 2015/0171740 A1* | 6/2015 | Seong | H02M 1/4208 320/162 |
| 2015/0180422 A1* | 6/2015 | Khlat | H03F 1/0238 330/291 |
| 2015/0188405 A1* | 7/2015 | Ben-Yaakov | H02M 3/01 323/312 |
| 2015/0214887 A1* | 7/2015 | Ben-Yaakov | H02M 3/01 307/52 |

(56) References Cited

U.S. PATENT DOCUMENTS

| | | | |
|---|---|---|---|
| 2015/0280553 A1* | 10/2015 | Giuliano | H02M 3/07 323/282 |
| 2016/0020693 A1* | 1/2016 | Ribarich | H02M 3/07 363/60 |
| 2016/0134233 A1* | 5/2016 | Chapman | H02M 7/48 307/31 |
| 2016/0164408 A1* | 6/2016 | Wang | H02M 7/2176 323/282 |
| 2016/0172889 A1* | 6/2016 | Kim | H02J 7/007182 320/107 |
| 2016/0197552 A1* | 7/2016 | Giuliano | H02M 3/07 363/60 |
| 2016/0380545 A1* | 12/2016 | Freeman | H02M 3/07 363/21.01 |
| 2017/0099011 A1* | 4/2017 | Freeman | H02M 7/06 |
| 2017/0126120 A1* | 5/2017 | Chakraborty | H02M 3/158 |
| 2017/0126133 A1* | 5/2017 | Yang | H02M 3/33576 |
| 2017/0179715 A1* | 6/2017 | Huang | H02M 3/155 |
| 2017/0237351 A1* | 8/2017 | Giuliano | H02M 3/07 323/271 |
| 2017/0244318 A1* | 8/2017 | Giuliano | H02M 3/07 |
| 2017/0302159 A1* | 10/2017 | Green | H02M 1/42 |
| 2017/0302160 A1* | 10/2017 | Marcinkiewicz | F25B 49/025 |
| 2018/0006554 A1* | 1/2018 | Giuliano | H02M 3/07 |
| 2018/0026526 A1* | 1/2018 | Ahmed | H02M 3/07 323/271 |
| 2018/0041060 A1* | 2/2018 | Walley | H02J 7/0045 |
| 2018/0083456 A1* | 3/2018 | Huang | H02J 7/02 |
| 2018/0083458 A1* | 3/2018 | Huang | H02J 7/0045 |
| 2018/0115246 A1* | 4/2018 | Azrai | G06F 1/26 |
| 2018/0145587 A1* | 5/2018 | Giuliano | H02M 7/25 |
| 2018/0175732 A1* | 6/2018 | Dai | H02M 3/33507 |
| 2018/0205315 A1* | 7/2018 | Giuliano | H02M 3/158 |
| 2018/0375362 A1* | 12/2018 | Huang | H02J 7/02 |
| 2019/0044443 A1* | 2/2019 | Giuliano | H02M 3/07 |
| 2019/0081548 A1* | 3/2019 | McRae | H02M 3/07 |
| 2019/0115830 A1* | 4/2019 | Giuliano | H02M 3/158 |
| 2019/0229623 A1* | 7/2019 | Tsuda | H02M 3/073 |
| 2019/0329663 A1* | 10/2019 | Kominami | H02J 7/0013 |
| 2019/0356149 A1* | 11/2019 | Li | H02M 3/33576 |
| 2019/0393777 A1* | 12/2019 | Giuliano | H02M 3/1582 |
| 2020/0007054 A1* | 1/2020 | Wolfe | H02J 7/0068 |
| 2020/0036286 A1* | 1/2020 | Giuliano | H02M 1/42 |
| 2020/0059165 A1* | 2/2020 | Xiao | H02M 7/06 |
| 2020/0127557 A1* | 4/2020 | Giuliano | H02M 3/158 |
| 2020/0153268 A1* | 5/2020 | Shinohara | H04B 3/548 |
| 2020/0177081 A1* | 6/2020 | Huang | H02M 3/07 |
| 2020/0177082 A1* | 6/2020 | Giuliano | H02M 3/07 |
| 2020/0204071 A1* | 6/2020 | Huang | H02M 3/07 |
| 2020/0212704 A1* | 7/2020 | Eftimie | H02M 3/07 |
| 2020/0227946 A1* | 7/2020 | Mao | H02J 7/02 |
| 2020/0227997 A1* | 7/2020 | McRae | H02M 3/07 |
| 2020/0304022 A1* | 9/2020 | Tsuda | H02M 3/073 |
| 2020/0328680 A1* | 10/2020 | Giuliano | H02M 3/07 |
| 2020/0336063 A1* | 10/2020 | Petersen | H02M 3/07 |
| 2020/0343808 A1* | 10/2020 | Low | H02M 3/07 |
| 2020/0366120 A1* | 11/2020 | Yuan | H02J 50/12 |
| 2020/0382017 A1* | 12/2020 | Giuliano | H02M 3/07 |
| 2020/0412237 A1* | 12/2020 | Dai | H02M 3/155 |
| 2020/0412240 A1* | 12/2020 | Aboueldahab | H02M 3/1582 |
| 2021/0013798 A1* | 1/2021 | Giuliano | H02M 3/07 |
| 2021/0034085 A1* | 2/2021 | Mercer | H02M 3/158 |
| 2021/0050786 A1* | 2/2021 | Park | H02M 3/07 |
| 2021/0075223 A1* | 3/2021 | Li | H02M 3/1588 |
| 2021/0083571 A1* | 3/2021 | Giuliano | H02M 3/073 |
| 2021/0091658 A1* | 3/2021 | Nogawa | H02M 1/14 |
| 2021/0126528 A1* | 4/2021 | King | H02J 7/0063 |
| 2021/0213842 A1* | 7/2021 | Lee | B60L 58/40 |
| 2021/0218329 A1* | 7/2021 | Hsiao | H02M 3/156 |
| 2021/0242771 A1* | 8/2021 | Chen | H02J 7/0068 |
| 2021/0367430 A1* | 11/2021 | Da Silva | H02M 3/158 |
| 2021/0367510 A1* | 11/2021 | Lawrence | H02M 3/1586 |
| 2021/0367511 A1* | 11/2021 | Liu | H02M 3/01 |
| 2021/0367513 A1* | 11/2021 | Mackay | H02M 3/1584 |
| 2021/0367514 A1* | 11/2021 | Lawrence | H02M 3/1584 |
| 2021/0367515 A1* | 11/2021 | Mackay | H02M 1/44 |
| 2021/0367517 A1* | 11/2021 | Lawrence | H02M 3/1586 |
| 2021/0367520 A1* | 11/2021 | Liu | H02M 3/158 |
| 2021/0376717 A1* | 12/2021 | Liu | H02M 3/01 |
| 2021/0384820 A1* | 12/2021 | Liu | H02M 1/007 |
| 2021/0399621 A1* | 12/2021 | Liu | H02M 3/01 |
| 2021/0408818 A1* | 12/2021 | Yang | H02J 7/00714 |
| 2022/0014091 A1* | 1/2022 | Low | H02M 3/158 |
| 2022/0029531 A1* | 1/2022 | Liu | H02M 3/01 |
| 2022/0029537 A1* | 1/2022 | Lawrence | H02M 1/14 |
| 2022/0069700 A1* | 3/2022 | Dai | H02M 7/797 |
| 2022/0103065 A1* | 3/2022 | Puggelli | H02M 1/36 |
| 2022/0131463 A1* | 4/2022 | Giuliano | H02M 3/155 |
| 2022/0140651 A1* | 5/2022 | Eftimie | H02J 50/10 320/108 |
| 2022/0140726 A1* | 5/2022 | Liu | H02M 1/0095 323/271 |
| 2022/0181971 A1* | 6/2022 | Mitev | G05F 1/563 |
| 2022/0181973 A1* | 6/2022 | Huang | H02M 3/07 |
| 2022/0209657 A1* | 6/2022 | Giuliano | H02M 3/07 |
| 2022/0224123 A1* | 7/2022 | Li | H02J 7/02 |
| 2022/0224229 A1* | 7/2022 | Giuliano | H02M 3/1582 |
| 2022/0278617 A1* | 9/2022 | Liu | H02J 7/00712 |
| 2022/0302732 A1* | 9/2022 | Wen | H02M 1/007 |
| 2022/0302826 A1* | 9/2022 | Matei | H02M 3/158 |
| 2022/0321001 A1* | 10/2022 | Huang | H02M 3/07 |
| 2022/0329151 A1* | 10/2022 | Yang | H02M 3/33523 |
| 2022/0337170 A1* | 10/2022 | Giuliano | H02M 3/07 |
| 2022/0352816 A1* | 11/2022 | Liu | H02M 3/07 |
| 2022/0368218 A1* | 11/2022 | Liu | H02M 3/01 |
| 2022/0368222 A1* | 11/2022 | Giuliano | H02M 3/07 |
| 2022/0393576 A1* | 12/2022 | King | H02J 7/00714 |
| 2022/0399746 A1* | 12/2022 | Tajima | H02J 7/02 |
| 2022/0407336 A1* | 12/2022 | Chang | H02M 3/1584 |
| 2023/0028873 A1* | 1/2023 | Liu | H02M 3/01 |
| 2023/0102466 A1* | 3/2023 | Huang | H02M 3/1584 323/282 |
| 2023/0146408 A1* | 5/2023 | Khlat | H02M 1/007 323/271 |
| 2023/0166633 A1* | 6/2023 | Lee | H02M 1/007 |
| 2023/0170785 A1* | 6/2023 | Lin | H02M 3/1582 363/13 |
| 2023/0179093 A1* | 6/2023 | Liu | H02M 1/0009 323/271 |
| 2023/0198280 A1* | 6/2023 | Dai | H02M 3/335 320/134 |
| 2023/0223843 A1* | 7/2023 | Liu | H02M 1/083 363/21.02 |
| 2023/0238887 A1* | 7/2023 | Lim | H02M 1/0095 |
| 2023/0246548 A1* | 8/2023 | Liu | H02M 3/07 323/271 |
| 2023/0318445 A1* | 10/2023 | Chase | H02M 3/156 320/166 |
| 2023/0318447 A1* | 10/2023 | Lim | H02M 3/1586 323/271 |
| 2023/0336074 A1* | 10/2023 | Liu | H02M 3/01 |
| 2023/0336075 A1* | 10/2023 | Liu | H02M 3/072 |
| 2023/0353051 A1* | 11/2023 | Giuliano | H02M 3/07 |
| 2023/0353054 A1* | 11/2023 | Hardy | H02M 3/1584 |
| 2023/0361674 A1* | 11/2023 | Liu | H02M 1/0009 |
| 2023/0396162 A1* | 12/2023 | Liu | H02M 1/0009 |
| 2023/0412074 A1* | 12/2023 | Giuliano | H02M 1/42 |
| 2024/0014736 A1* | 1/2024 | Giuliano | H02M 3/073 |
| 2024/0063723 A1* | 2/2024 | Blinov | H02M 1/0093 |
| 2024/0072633 A1* | 2/2024 | Liu | H02M 1/0009 |
| 2024/0079956 A1* | 3/2024 | Lim | H02M 3/1582 |
| 2024/0106335 A1* | 3/2024 | Thrimawithana | H02M 1/083 |
| 2024/0128875 A1* | 4/2024 | Bonavente | H02M 1/0006 |
| 2024/0136847 A1* | 4/2024 | Zhang | H02J 7/0029 |
| 2024/0146188 A1* | 5/2024 | Pilawa-Podgurski | H02M 1/007 |
| 2024/0204658 A1* | 6/2024 | Phadke | H02M 3/07 |
| 2024/0204659 A1* | 6/2024 | Dalena | H02M 1/0058 |
| 2024/0204662 A1* | 6/2024 | Lim | H02M 3/07 |
| 2024/0223086 A1* | 7/2024 | Liu | H02M 1/0058 |
| 2024/0235246 A9* | 7/2024 | Zhang | H02M 3/33584 |
| 2024/0235370 A1* | 7/2024 | Liu | H02M 3/07 |

(56) References Cited

U.S. PATENT DOCUMENTS

| | | | |
|---|---|---|---|
| 2024/0235388 A1* | 7/2024 | Yang | H02M 1/32 |
| 2024/0297580 A1* | 9/2024 | Liu | H02M 3/07 |
| 2024/0372467 A1* | 11/2024 | Liu | H02M 1/0095 |
| 2024/0396446 A1* | 11/2024 | Giuliano | H02M 3/07 |
| 2024/0405683 A1* | 12/2024 | Liu | H02M 1/0009 |

OTHER PUBLICATIONS

Introduction_to_USB__Advantages__Disadvantages_and_Architecture (Year: 2024).*

What_Are_the_Advantages_of_USB_PD_and_How_Does_it_Work (Year: 2024).*

* cited by examiner

HIGH EFFICIENCY CHARGING SYSTEM AND POWER CONVERSION CIRCUIT THEREOF

CROSS REFERENCE

The present invention claims priority to U.S. 63/117,425 filed on Nov. 23, 2020 and claims priority to TW 110116101 filed on May 4, 2021.

BACKGROUND OF THE INVENTION

Field of Invention

The present invention relates to a charging system; particularly, it relates to a high efficiency charging system including an inductive switching power converter and a capacitive switching power converter. The present invention also relates to a power conversion circuit for use in a high efficiency charging system.

Description of Related Art

Please refer to FIG. 1, which shows a schematic circuit diagram of a conventional inductive switching power converter (i.e., inductive switching power converter 1001). The inductive switching power converter 1001 includes: at least one inductor L and switching devices (e.g., M11 and M12). The switching devices (e.g., M11 and M12) switch a coupling relationship of the inductor L with a DC power (e.g., VBUS and IBUS) and a charging power (e.g., VCH and ICH), so as to convert the DC power to the charging power. For example, the inductive switching power converter 1001 can be a buck switching power converter.

Please refer to FIG. 2, which shows a schematic circuit diagram of a conventional capacitive switching power converter (i.e., capacitive switching power converter 1002). The capacitive switching power converter 1002 includes: at least one conversion capacitor CF and switching devices. The switching devices switch a coupling relationship of the inductor L with a DC power (e.g., VBUS) and a charging power (e.g., VCH and ICH), so as to convert the DC power to the charging power. For example, the capacitive switching power converter 1002 can be a voltage-divided type switching power converter.

Please refer to FIG. 3, which shows a schematic circuit diagram of a conventional load switch circuit (i.e., load switch circuit 1003). In a case wherein a power delivery unit 100 is an adapter complying with the universal serial bus (USB) power delivery (PD) protocol, the power delivery unit 100 can directly provide charging power according to the state and the charging stage of a battery. More specifically, the power delivery unit 100 can adaptively adjust for example a constant voltage or a constant current, which is directly provided to the battery 300 via the load switch circuit 1003, whereby the required stages of the power conversion circuit can be reduced, thus enhancing the power conversion efficiency of the entire charging system. However, the prior art shown in FIG. 3 has a drawback that: when a user adopts an old type adapter which can only provide one fixed constant voltage (which is not a constant voltage that can be adaptively adjustable), the load switch circuit 1003 is unable to provide the required power conversion.

In view of the above, to overcome the drawbacks in the prior art, the present invention proposes a serial connection type power conversion circuit, which has an inductive switching power converter connected in series to a capacitor. By adaptively controlling the inductive switching power converter and the capacitor according to a relationship between a DC power and a charging power, the power conversion circuit of the present invention can operate flexibly in and switch dynamically between a typical regulation mode and a bypass mode, thus enhancing the power conversion efficiency of the entire charging system.

SUMMARY OF THE INVENTION

From one perspective, the present invention provides a power conversion circuit, comprising: an inductive switching power converter, which is configured to operably switch an inductor, so as to convert a DC power to a first power; and a capacitive switching power converter, which is configured to operably switch a conversion capacitor, so as to convert the first power to a charging power; wherein the inductive switching power converter and the capacitive switching power converter are determined to operate in one of plural combinations of regulation modes and bypass modes according to a parameter of the DC power; wherein in the regulation mode, the inductive switching power converter is configured to operably regulate the first power to a first predetermined target level, or wherein in the regulation mode, the capacitive switching power converter is configured to operably regulate the charging power to a second predetermined target level; wherein in the bypass mode, the inductive switching power converter is configured to operably bypass the DC power to the first power, or wherein in the bypass mode, the capacitive switching power converter is configured to operably bypass the first power to the charging power.

In one embodiment, the inductive switching power converter includes a plurality of first switching devices, which are configured to operably switch a coupling relationship of the inductor with the DC power and the first power, so as to convert the DC power to the first power; and the capacitive switching power converter includes a plurality of second switching devices, which are configured to operably switch a coupling relationship of the conversion capacitor with the first power and the charging power, so as to convert the first power to the charging power; wherein the inductive switching power converter has a first regulation mode and a first bypass mode, wherein in the first regulation mode, the plurality of first switching devices are configured to operably switch the inductor, so as to regulate the first power to the first predetermined target level, wherein in the first bypass mode, at least one of the first switching devices is controlled to be always ON, so as to bypass the DC power to the first power; wherein the capacitive switching power converter has a second regulation mode and a second bypass mode, wherein in the second regulation mode, the plurality of second switching devices are configured to operably switch the conversion capacitor, so as to regulate the charging power to the second predetermined target level, wherein in the second bypass mode, at least one of the second switching devices is controlled to be always ON, so as to bypass the first power to the charging power; wherein the power conversion circuit is configured to operably determine the inductive switching power converter to operate in the first regulation mode or the first bypass mode according to the parameter of the DC power and/or to operably determine the capacitive switching power converter to operate in the second regulation mode or the second bypass mode according to the parameter of the DC power.

In some embodiments, (1) when a DC voltage of the DC power is lower than a first threshold, the inductive switching power converter operates in the first bypass mode, wherein the first threshold is correlated with a charging voltage of the charging power; or (2) when a DC voltage of the DC power is lower than a second threshold, the capacitive switching power converter operates in the second bypass mode, wherein the second threshold is correlated with a product of the charging voltage multiplied by a current amplification ratio, wherein the current amplification ratio is a ratio of a charging current of the charging power to a first current of the first power; or (3) when a DC current of the DC power is a constant, the inductive switching power converter operates in the first bypass mode; or (4) when the DC current of the DC power is a constant and when the DC voltage is a variable and the variable covers a range which exceeds the second threshold, the inductive switching power converter operates in the first bypass mode, whereas, the capacitive switching power converter operates in the second bypass mode.

In one embodiment, the inductive switching power converter is a buck switching power converter or a buck-boost switching power converter.

In one embodiment, the DC power is provided from an AC-DC converter.

In one embodiment, the capacitive switching power converter is a voltage-divided type capacitive switching power converter.

In one embodiment, a charging voltage of the charging power is ½-fold or ¼-fold of a first voltage of the first power, and wherein a charging current of the charging power is 2-fold or 4-fold of a first current of the first power.

In one embodiment, in a case wherein the inductive switching power converter is configured as a buck switching power converter and in a case wherein the DC voltage is programmable and the DC voltage is lower than the first threshold, an upper gate switch of the plurality of first switching devices is fully ON, so as to bypass the DC power to the first power.

In one embodiment, when the DC voltage of the DC power is lower than the second threshold, a part of the plurality of second switching devices are fully ON, so as to bypass the first power to the charging power.

In one embodiment, the AC-DC converter is an adapter complying with the universal serial bus (USB) power delivery (PD) protocol.

In one embodiment, the power conversion circuit further comprises: a control circuit, which is configured to operably control a DC voltage of the DC power and/or a DC current of the DC power via an communication interface.

In one embodiment, the communication interface is a D+ signal and a D− signal of the USB protocol or the communication interface is a CC1 signal and a CC2 signal of the USB PD protocol.

In one embodiment, the power conversion circuit further comprises: a control circuit, which is configured to operably control a DC voltage of the DC power and/or a DC current of the DC power, so that the power conversion circuit operates at a maximum efficiency operation point.

From another perspective, the present invention provides a charging system, which is configured to operably convert an input power to a charging power; the charging system comprising: a power delivery unit, which is configured to operably convert the input power to a DC power; and a power conversion circuit of any of the above embodiments, which is configured to operably convert the DC power to the charging power.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
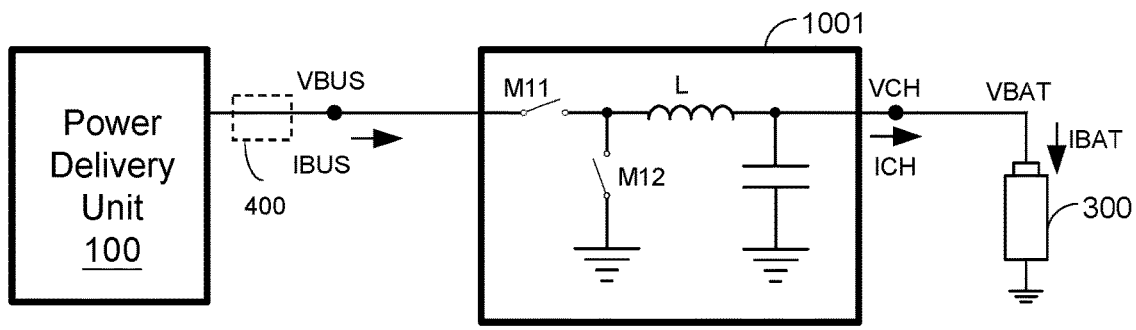
FIG. 1 shows a schematic circuit diagram of a conventional inductive switching power converter.
Figure 2:
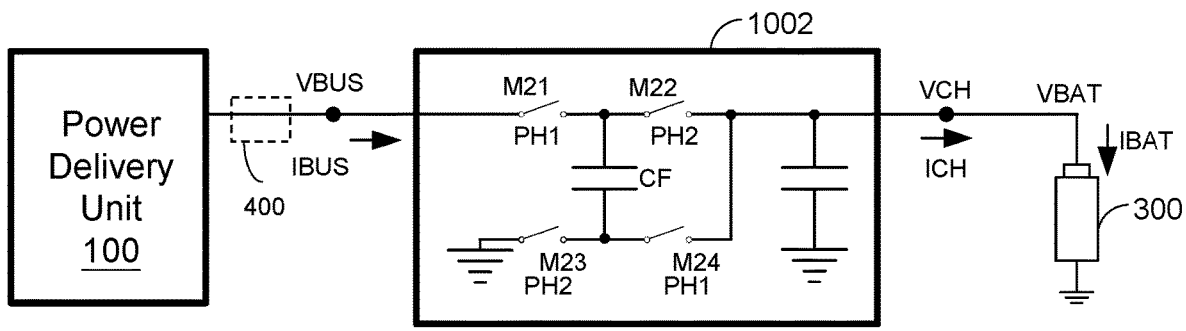
FIG. 2 shows a schematic circuit diagram of a conventional capacitive switching power converter.
Figure 3:
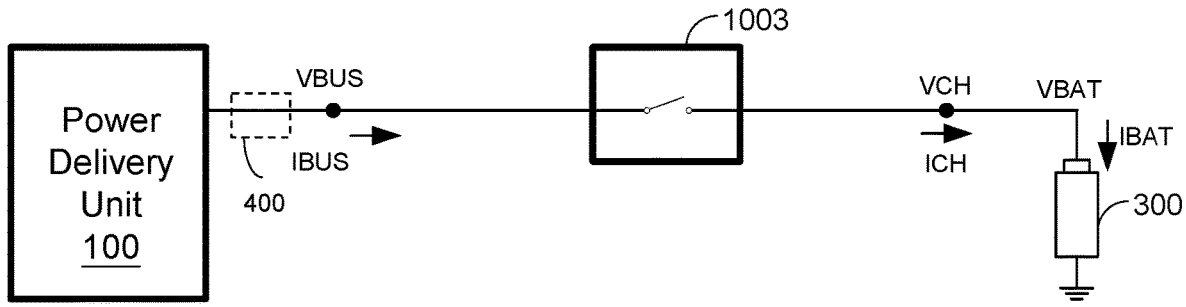
FIG. 3 shows a schematic circuit diagram of a conventional load switch circuit.
Figure 4:
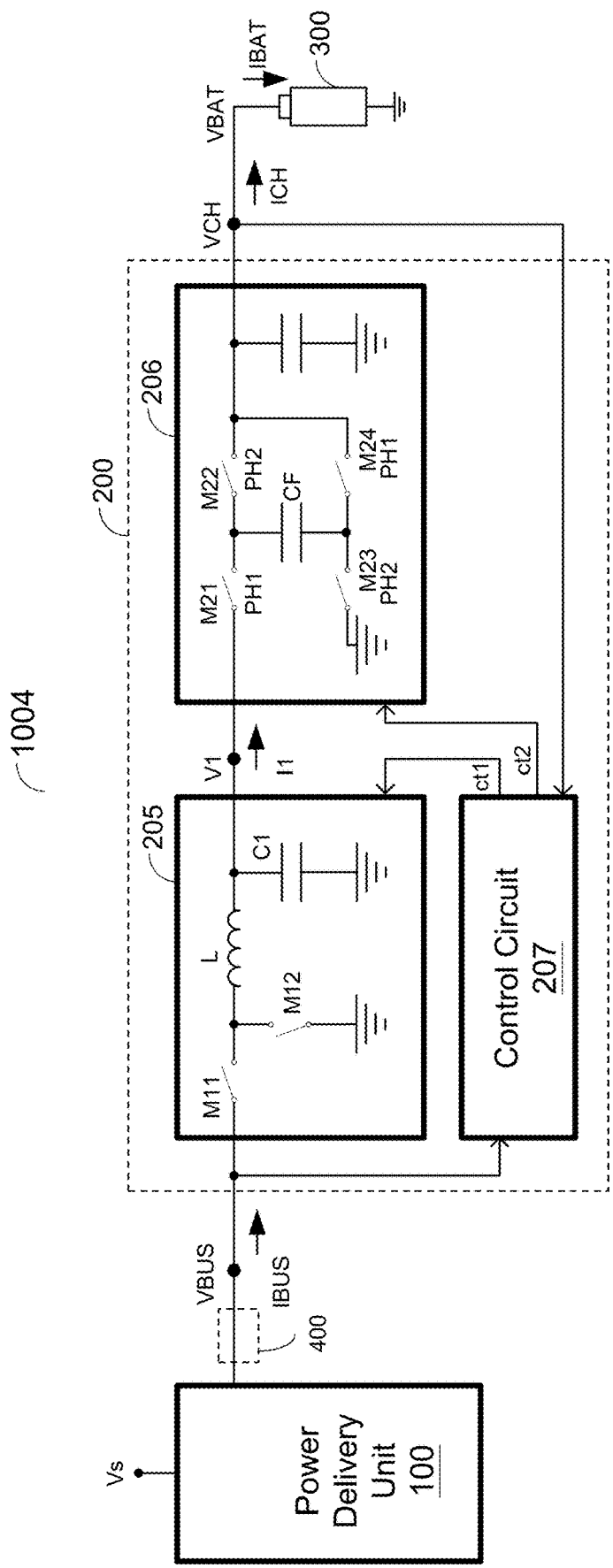
FIG. 4 shows a high efficiency charging system and a power conversion circuit thereof according to an embodiment of the present invention.
Figure 5:
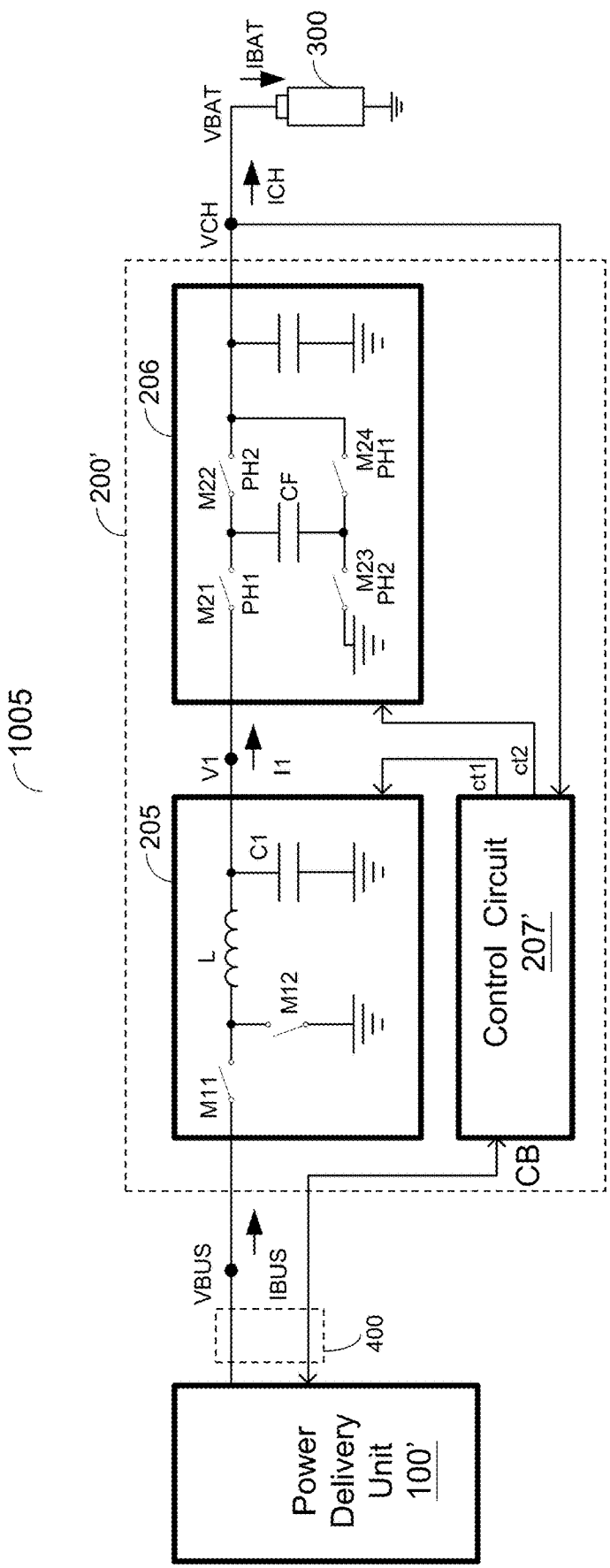
FIG. 5 shows a high efficiency charging system and a power conversion circuit thereof according to another embodiment of the present invention.

Please refer to FIG. 4 in conjugation with FIG. 5. FIG. 4 shows a high efficiency charging system and a power conversion circuit thereof (i.e., charging system 1004 and power conversion circuit 200) according to an embodiment of the present invention.

The charging system 1004 includes: a power delivery unit 100, a power conversion circuit 200 and a battery. In one embodiment, the charging system 1004 further includes a removable cable 400. The power delivery unit 100 is configured to operably convert an input power Vs to a DC power (which includes a DC voltage VBUS and a DC current IBUS). In one embodiment, the power delivery unit 100 can be, for example but not limited to, an AC-DC converter. In this embodiment, the input power Vs for example is an AC power and the power delivery unit 100 is configured to operably convert the input power Vs to the DC power. In one embodiment, the power delivery unit 100 can be, for example but not limited to, an adapter complying with the universal serial bus (USB) protocol.

Please refer to FIG. 4 in conjugation with FIG. 5. FIG. 5 shows a high efficiency charging system and a power conversion circuit thereof (i.e., charging system 1005 and power conversion circuit 200') according to another embodiment of the present invention. In one embodiment, the power delivery unit 100' can be, for example but not limited to, an adapter complying with the universal serial bus (USB) power delivery (PD) protocol. The power conversion circuit 200' can send requests to the power delivery unit 100' via a communication interface CB, so that the power delivery unit 100' can generate a DC voltage VBUS of the DC power and/or a DC current IBUS of the DC power complying with the requests. In one embodiment, the communication interface CB can be, for example but not limited to, the D+ signal and D− signal of the USB protocol or the CC1 signal and CC2 signal of the USB power delivery (PD) protocol.

In another embodiment (as shown in FIG. 5), the power conversion circuit 200' can obtain information of or measure a level of the DC voltage VBUS and a level of the DC current IBUS. The above-mentioned communication interface CB can be controlled by a control circuit 207'.

Please still refer to FIG. 4. The power conversion circuit 200 is configured to operably convert a DC power to a charging power (which includes: a charging voltage VCH and a charging current ICH). In one embodiment, the power conversion circuit 200 comprises: an inductive switching power converter 205, a capacitive switching power converter 206 and a control circuit 207.

The inductive switching power converter includes: at least one inductor L and plural switching devices (e.g., an upper gate switch M11 and a lower gate switch M12 as shown in FIG. 4). The upper gate switch M11 and the lower gate switch M12 are configured to operably switch a coupling relationship of the inductor L with the DC power and the first power, so as to convert the DC power to the first power (i.e., including a first voltage V1 and a first current I1).

In one embodiment, the inductive switching power converter 205 has a first regulation mode and a first bypass mode. When the inductive switching power converter 205 is in the first regulation mode, the control circuit 207 is configured to generate a control signal ct1 for controlling the switching devices of the inductive switching power converter 205, so as to regulate the first power to a first predetermined target level, such as to regulate the first voltage V1 to a predetermined voltage level or to regulate the first current I1 to a predetermined current level. Besides, when the inductive switching power converter 205 is in the first bypass mode, the control circuit 207 is configured to control a part of the switching devices, so as to bypass the DC power to the first power (i.e., to electrically connect the DC power directly to the first power).

Please still refer to FIG. 4. The capacitive switching power converter 206 includes: at least one conversion capacitor CF and plural switching devices (e.g., switching devices M21, M22, M23 and M24 as shown in FIG. 4). The switching devices M21, M22, M23 and M24 in FIG. 4 are configured to operably switch a coupling relationship of the conversion capacitor CF with the first power and the charging power, so as to convert the first power to the charging power.

In one embodiment, the capacitive switching power converter 206 has a second regulation mode and a second bypass mode. When the capacitive switching power converter 206 is in the second regulation mode, the control circuit 207 is configured to generate a control signal ct2 for controlling the switching devices of the capacitive switching power converter 206, so as to regulate the charging power to a second predetermined target level, such as to regulate the charging voltage VCH to a predetermined voltage level or to regulate the charging current ICH to a predetermined current level. Besides, when the capacitive switching power converter 206 is in the second bypass mode, the capacitive switching power converter 206 is configured to control a part of the switching devices to be ON, so as to bypass the first power to the charging power (i.e., to electrically connect the first power directly to the charging power).

Please still refer to FIG. 4. In one embodiment, the capacitive switching power converter 206 can be a voltage-divided type capacitive switching power converter. That is, the charging voltage VCH of the charging power is 1/k-fold of the a first voltage V1 of the first power, and the charging current ICH of the charging power is k-fold of the first current I1 of the first power, wherein k, referred to as "current amplification ratio", denotes a real number greater than one. More specifically, in one embodiment, as shown in FIG. 4, the current amplification ratio k can be two, that is, the charging voltage VCH of the charging power is ½-fold of the first voltage V1 of the first power, and the charging current ICH of the charging power is 2-fold of the first current I1 of the first power. In another embodiment, as shown in FIG. 4, the current amplification ratio k can be four, that is, the charging voltage VCH of the charging power is ¼-fold of the first voltage V1 of the first power, and the charging current ICH of the charging power is 4-fold of the first current I1 of the first power.

More specifically, in this embodiment, the control circuit 207 controls the switching devices M21, M22, M23 and M24 of the capacitive switching power converter 206, so that one end of the conversion capacitor CF is switched periodically between the first voltage V1 in a first charging conversion interval (e.g., PH1) and the charging voltage VCH in a second charging conversion interval (e.g., PH2). In addition, the control circuit 207 controls the switching devices M21, M22, M23 and M24 of the capacitive switching power converter 206, so that another end of the conversion capacitor CF is switched periodically between the charging voltage VCH in the first charging conversion interval PH1 and the ground level in the second charging conversion interval PH2. As the result, the charging voltage VCH of the charging power is ½-fold of the first voltage V1 of the first power, whereas, the charging current ICH of the charging power is 2-fold of the first current I1 of the first power.

In one embodiment, the aforementioned part of switching devices which are controlled in the first bypass mode, are configured to operably switch the inductor L to achieve inductive switching power conversion in the first regulation mode. From one perspective, in the first regulation mode, within each switching period, the aforementioned part of switching devices are configured to operably turn ON or turn OFF the inductor L for at least an interval. That is, the aforementioned part of switching devices are not dedicated only for bypassing connection; instead, the aforementioned part of switching devices provide the function of periodically switching the inductor L in the first regulation mode.

On the other hand, in one embodiment, the aforementioned part of switching devices which are controlled in the second bypass mode, are configured to operably switch the conversion capacitor CF to achieve capacitive switching power conversion in the second regulation mode. From one perspective, in the second regulation mode, within each switching period, the aforementioned part of switching devices are configured to operably turn ON or turn OFF the conversion capacitor CF each for at least an interval. That is, the aforementioned part of switching devices are not dedicated only for bypassing connection.

Please still refer to FIG. 4. In one embodiment, the control circuit 207 determines the inductive switching power converter 205 to operate in the first regulation mode or the first bypass mode, and determines the capacitive switching power converter 206 to operate in the second regulation mode or the second bypass mode, according to at least one of the parameters of the DC power and the charging power. In one embodiment, the parameters of the DC power and the charging power can be, for example but not limited to, at least one of the following: the DC voltage VBUS, the DC current IBUS, the charging voltage VCH, and/or the charging current ICH. In one embodiment, the control circuit 207 selectively determines a combination of the above-mentioned operation modes for the inductive switching power converter 205 and the capacitive switching power converter 206 to operate within according to a relationship between the aforementioned one or more parameters with at least one threshold. Or, in another embodiment, the control circuit 207 selectively determines a combination of the above-mentioned operation modes for the inductive switching power converter 205 and the capacitive switching power converter 206 to operate within according to a relationship between at least two of the DC voltage VBUS, the DC current IBUS, the charging voltage VCH, and the charging current ICH, such as a difference therebetween or a ratio therebetween. The details of such mechanism will be explained in more detail later.

Figure 6A:
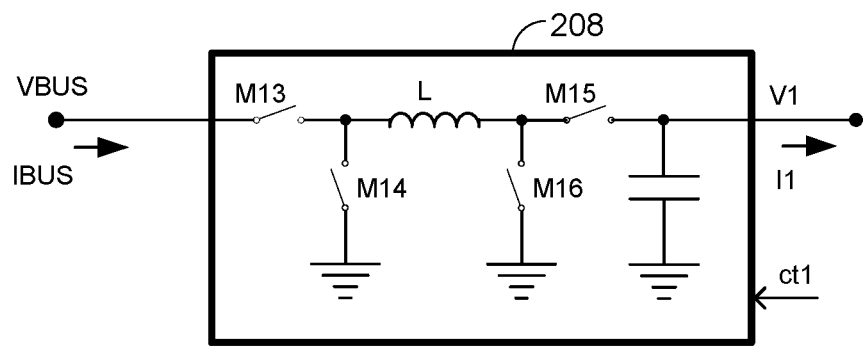
FIG. 6A shows a specific embodiment of an inductive switching power converter.
Figure 6B:
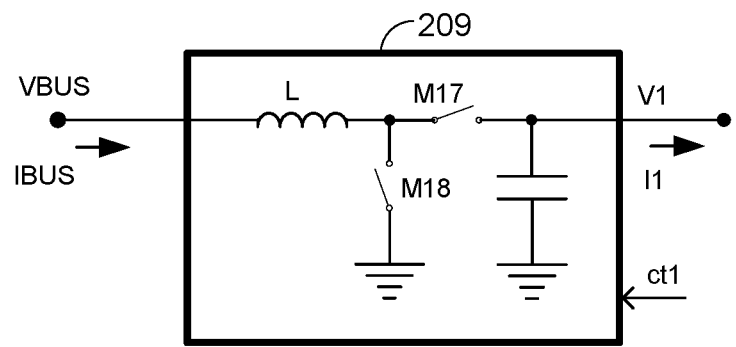
FIG. 6B shows a specific embodiment of an inductive switching power converter.

Please still refer to FIG. 4. In one embodiment, the inductive switching power converter is for example a buck switching power converter (corresponding to 205) as shown in the embodiment of FIG. 4. Or, the inductive switching power converter is for example a buck-boost switching power converter (corresponding to 208) as shown in the embodiment of FIG. 6A. Or, the inductive switching power converter is for example a boost switching power converter (corresponding to 209) as shown in the embodiment of FIG. 6B. The inductive switching power converter also can be implemented as other types of switching power converter, as long as it is a switching power converter having switching devices for operating its inductor and at least part of the switching devices can be used to bypass its input (i.e., DC power in the aforementioned embodiment) to its output (i.e., first power in the aforementioned embodiment).

Please still refer to FIG. 4. In one specific embodiment, in the first bypass mode, the control circuit 207 controls the upper-gate switch M11 to be always ON. In one embodiment, in the first bypass mode, the control circuit 207 controls the lower-gate switch M12 to be always OFF. In another embodiment, the lower-gate switching device can be replaced by for example a diode. From one perspective, in the first bypass mode, the bypass path connecting the DC power to the first power includes both of the upper-gate switch M11 which is always ON and the inductor L.

Please refer to FIG. 6A. In this embodiment, in the first bypass mode, the input upper-gate switch M13 and the output upper-gate switch M15 are controlled to be always ON, whereas, the input lower-gate switch M14 and the output lower-gate switch M16 are controlled to be always OFF.

Please refer to FIG. 6B. In this embodiment, in the first bypass mode, the upper-gate switch M17 is controlled to be always ON, whereas, the lower-gate switch M18 is controlled to be always OFF.

On the other hand, please refer to FIG. 4. In one specific embodiment, in the second bypass mode, the control circuit 207 controls the switching devices M21 and M22 to be always ON, whereas, the control circuit 207 controls the switching device M24 to be always OFF. In one embodiment, in the second bypass mode, the switching device M23 can be always ON or always OFF.

The following descriptions will explain the present invention by the buck type inductive switching power converter and the voltage-divided type capacitive switching power converter as shown in FIG. 4, but this is only an illustrative example and not for limiting the broadest scope of the present invention.

Figure 7:
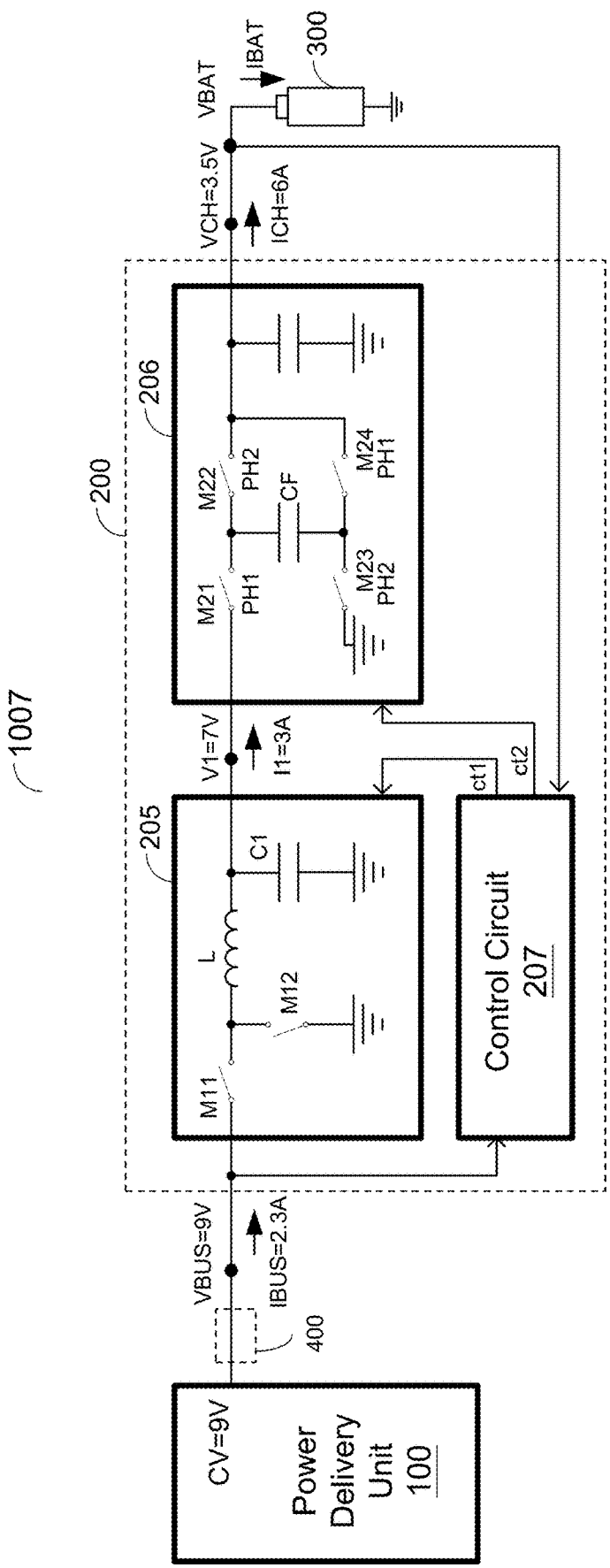
FIG. 7 shows a high efficiency charging system and a power conversion circuit thereof according to yet another embodiment of the present invention.

Please refer to FIG. 7, which shows a high efficiency charging system and a power conversion circuit thereof (i.e., charging system 1007 and power conversion circuit 200) according to yet another embodiment of the present invention. This embodiment is a derivative of the embodiment of FIG. 4. In this embodiment, the DC voltage VBUS generated from the power delivery unit 100 is for example equal to 9V, whereas, the DC current IBUS generated from the power delivery unit 100 is for example equal to 2.3 A. In other words, in this embodiment, a maximum power that is outputted from the power delivery unit 100 is approximately equal to 21 W. Besides, in this embodiment, the battery voltage VBAT (corresponding to the charging voltage VCH) is for example equal to 3.5V. And, this embodiment can charge the battery 300 by the charging current ICH (corresponding to the battery current IBAT) in a constant current mode. Besides, if the capacitive switching power converter 206 is controlled to operate in the second regulation mode, in a case wherein the current amplification ratio k is equal to two, the first voltage V1 (which is equal to 2-fold of the charging voltage VCH) will be equal to 7V. Under such situation, the difference between the DC voltage VBUS and the first voltage V1 remains greater than zero, so the capacitive switching power converter 206 is operable in the second regulation mode. In one embodiment, the control circuit 207 can determine that the inductive switching power converter 205 operates in the first regulation mode and that the capacitive switching power converter 206 operates in the second regulation mode. Under such circumstance, this embodiment can charge the battery 300 with maximum power. More specifically, in this embodiment, in the first regulation mode, the DC voltage VBUS is equal to 9V; the DC current IBUS is equal to 2.3 A; the first voltage V1 is equal to 7V; and the first current is equal to 3 A. In the second regulation mode, the charging voltage VCH is equal to 3.5V, and the charging current ICH is equal to 6 A.

Figure 8:
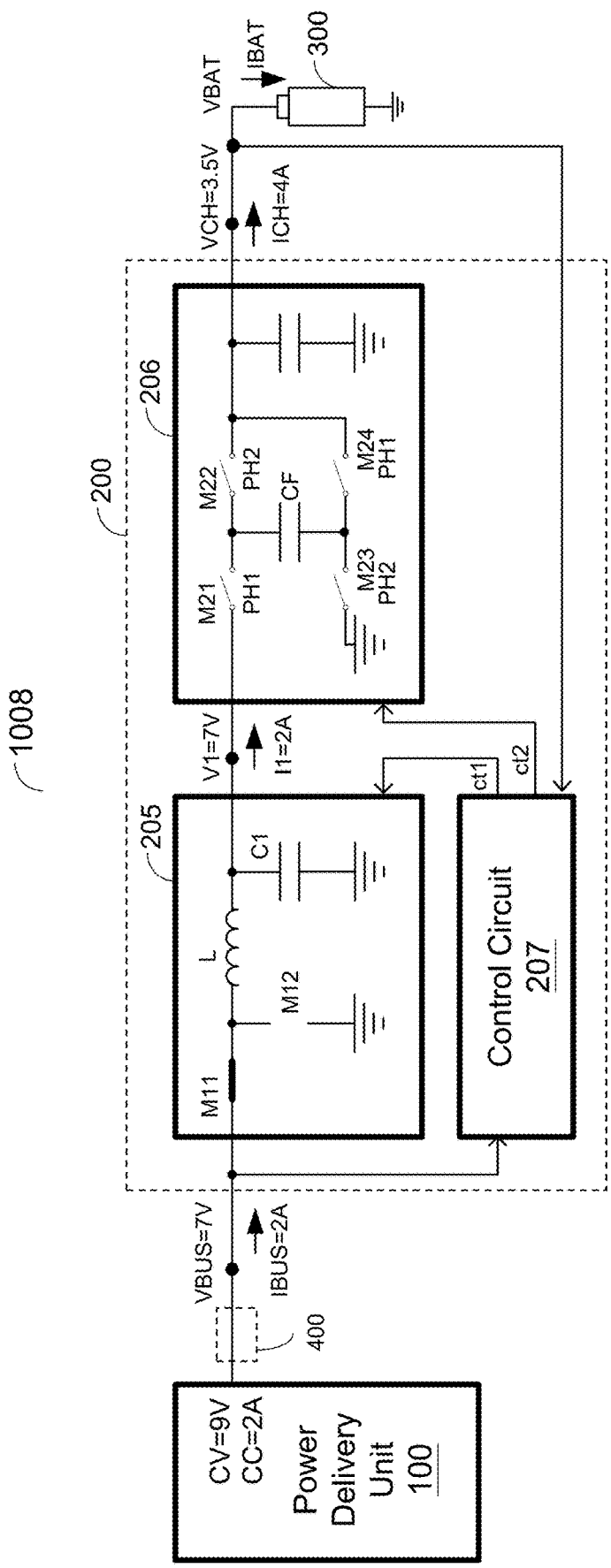
FIG. 8 shows a high efficiency charging system and a power conversion circuit thereof according to still another embodiment of the present invention.

Please refer to FIG. 8, which shows a high efficiency charging system and a power conversion circuit thereof (i.e., charging system 1008 and power conversion circuit 200) according to still another embodiment of the present invention. This embodiment is a derivative of the embodiment of FIG. 4. In this embodiment, the DC voltage VBUS generated from the power delivery unit 100 is for example equal to 9V, whereas, the DC current IBUS generated from the power delivery unit 100 is for example equal to 2 A. In other words, in this embodiment, a maximum power that is outputted from the power delivery unit 100 is equal to 18 W. Besides, in this embodiment, the battery voltage VBAT (corresponding to the charging voltage VCH) is for example equal to 3.5V. And, this embodiment can charge the battery 300 by the charging current ICH (corresponding to the battery current IBAT) in a constant current mode. Besides, if the capacitive switching power converter 206 is controlled to operate in the second regulation mode, in a case wherein the current amplification ratio k is equal to two, the first voltage V1 (which is equal to 2-fold of the charging voltage VCH) will be equal to 7V. Under such situation, the difference between the DC voltage VBUS and the first voltage V1 remains greater than zero, so the capacitive switching power converter 206 is operable in the second regulation mode.

In one embodiment, as shown in FIG. 8, the control circuit 207 can determine that the inductive switching power converter 205 operates in the first regulation mode (wherein a thick solid line indicates that M11 is always ON, whereas, a blank indicates that M12 is always OFF) and that the capacitive switching power converter 206 operates in the second regulation mode. More specifically, in this embodiment, the power delivery unit 100 supplies maximum constant current, i.e., the DC current IBUS is equal to 2 A. Because the inductive switching power converter 205 operates in the first regulation mode, the first current is also equal to 2 A. On the other hand, because the capacitive switching power converter 206 operates in the second regulation mode, the charging current is equal to 4 A and the DC voltage VBUS and the first voltage V1 are both equal to 7V.

It is worthwhile mentioning that, under such situation, because the inductive switching power converter 205 does not execute switching operation, the power loss is reduced. As a result, the charging system 1008 can charge the battery 300 with a relatively higher power conversion efficiency. In a case wherein the power delivery unit 100 is a portable device powered by a battery or is a power bank, the battery life of the power delivery unit 100 can be prolonged. Besides, the power conversion circuit 200 which is generally located in a mobile device can reduce its operation temperature.

Besides, in another embodiment wherein the inductive switching power converter 205 has a maximum duty ratio Dmax, in a case wherein the relationship between the DC voltage VBUS and the first voltage V1 causes the inductive switching power converter 205 need to operate above maximum duty ratio Dmax in the first regulation mode, the control circuit 207 can determine that the inductive switching power converter 205 operates in the first bypass mode.

Figure 9:
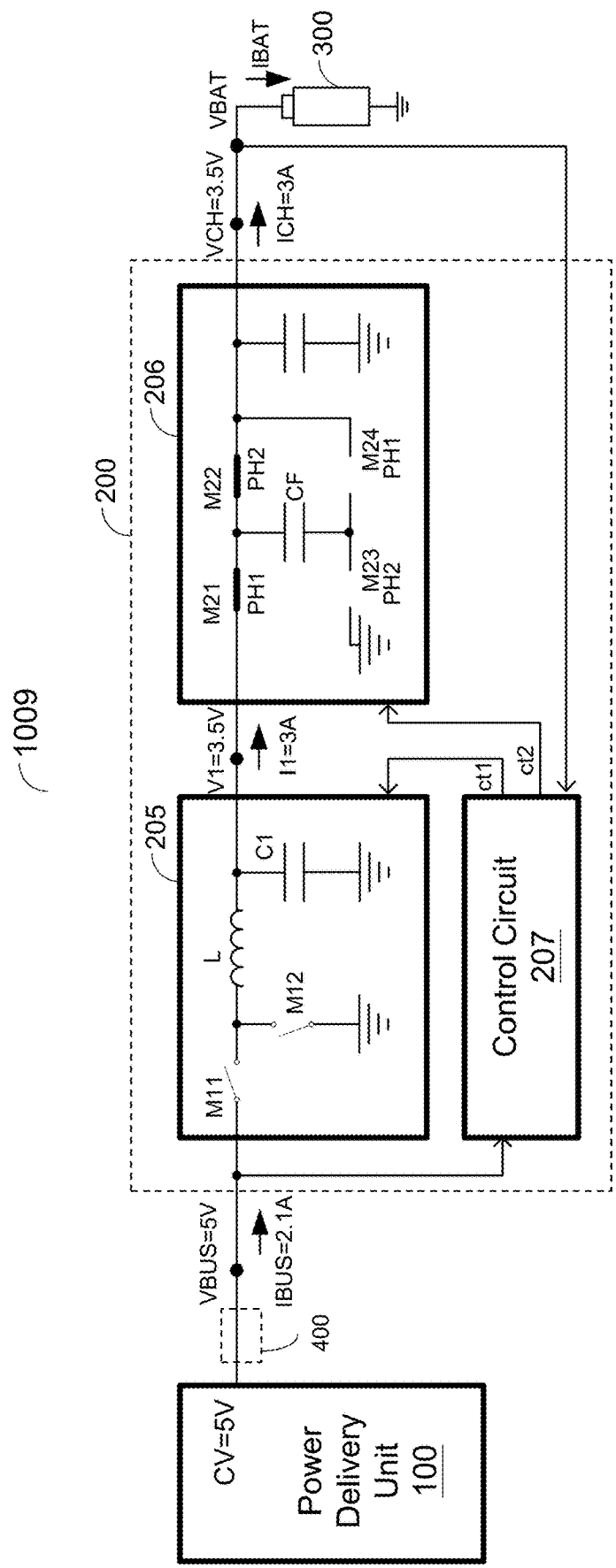
FIG. 9 shows a high efficiency charging system and a power conversion circuit thereof according to still another embodiment of the present invention.

Please refer to FIG. 9, which shows a high efficiency charging system and a power conversion circuit thereof (i.e., charging system 1009 and power conversion circuit 200) according to still another embodiment of the present invention. This embodiment is a derivative of the embodiment of FIG. 4. In this embodiment, the DC voltage VBUS generated from the power delivery unit 100 is for example equal to 5V, whereas, the DC current IBUS generated from the power delivery unit 100 is for example equal to 2.1 A. In other words, in this embodiment, a maximum power that is outputted from the power delivery unit 100 is equal to 10.5 W. Besides, in this embodiment, the battery voltage VBAT (corresponding to the charging voltage VCH) is for example equal to 3.5V. And, this embodiment can charge the battery 300 by the charging current ICH (corresponding to the battery current IBAT) in a constant current mode. Besides, if the capacitive switching power converter 206 is controlled to operate in the second regulation mode, in a case wherein the current amplification ratio k is equal to two, the first voltage V1 (which is equal to 2-fold of the charging voltage VCH) will be equal to 7V. Under such situation, the difference between the DC voltage VBUS and the first voltage V1 is smaller than zero, so the capacitive switching power converter 206 is not operable in the second regulation mode.

In one embodiment, as shown in FIG. 9, the control circuit 207 can determine that the inductive switching power converter 205 operates in the first regulation mode and that the capacitive switching power converter 206 operates in the second bypass mode (wherein a thick solid line indicates that M11 and M12 are always ON, whereas, a blank indicates that M23 and M24 are always OFF). Under such circumstance, this embodiment can charge the battery 300 with maximum power. More specifically, in this embodiment, in the first regulation mode, the DC voltage VBUS is equal to 5V; because the inductive switching power converter 205 operates in the first regulation mode, the first current I1 is regulated to be 3 A. On the other hand, the DC voltage VBUS is equal to 5V; because the capacitive switching power converter 206 operates in the second bypass mode and because the first voltage V1 is the same as the battery voltage VBAT (both are equal to 3.5V), the DC current IBUS is regulated to be 2.1 A. That is, this embodiment can charge the battery 300 with maximum power.

Figure 10:
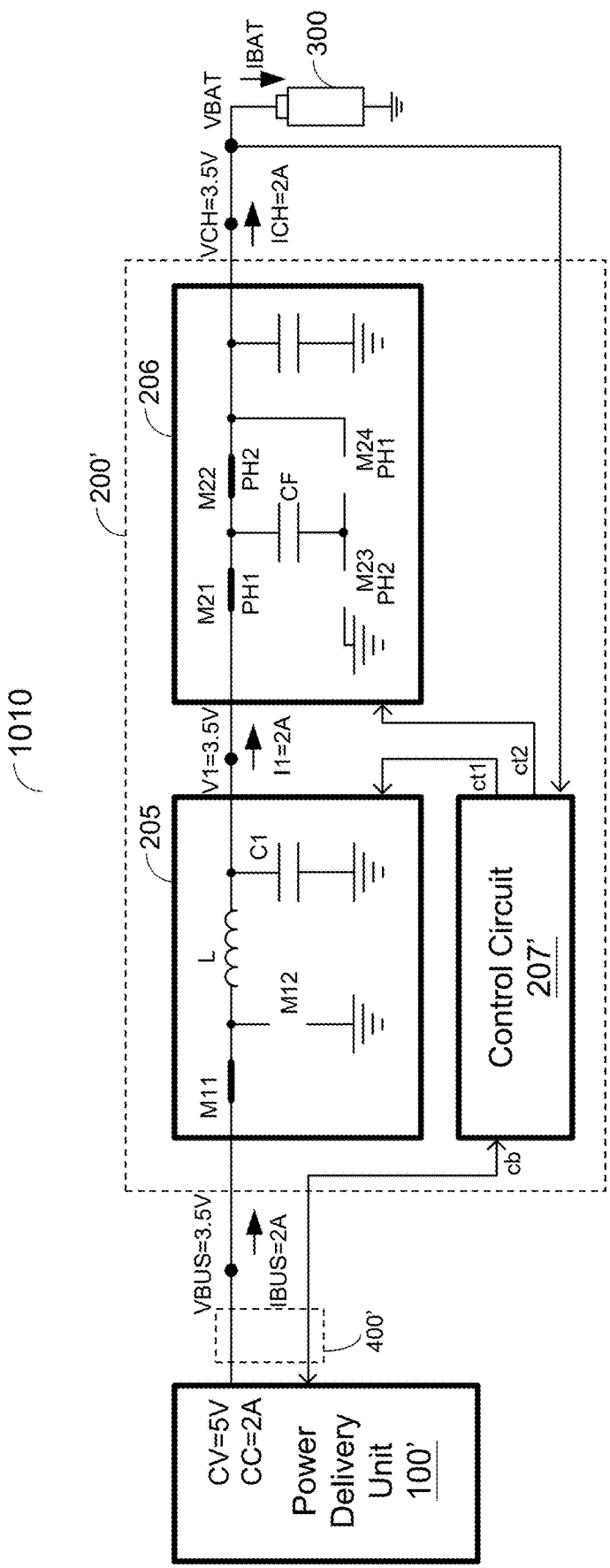
FIG. 10 shows a high efficiency charging system and a power conversion circuit thereof according to still another embodiment of the present invention.

Please refer to FIG. 10, which shows a high efficiency charging system and a power conversion circuit thereof (i.e., charging system 1010 and power conversion circuit 200) according to still another embodiment of the present invention. This embodiment is a derivative of the embodiment of FIG. 4. In this embodiment, the DC voltage VBUS generated from the power delivery unit 100 is for example equal to 5V, whereas, the DC current IBUS generated from the power delivery unit 100 is for example equal to 2 A. In other words, in this embodiment, a maximum power that is outputted from the power delivery unit 100 is equal to 10 W. Similar to the embodiment of FIG. 9, the relationship between the DC voltage VBUS and the first voltage V1 does not allow the capacitive switching power converter 206 to operable in the second regulation mode.

In one embodiment, as shown in FIG. 10, the control circuit 207 can determine that the inductive switching power converter 205 operates in the first bypass mode and that the capacitive switching power converter 206 operates in the second bypass mode. The control circuit 207 can instruct the power delivery unit 100 via the above-mentioned communication interface CB to output a constant current. More specifically, in this embodiment, the DC current IBUS generated from the power delivery unit 100 is regulated to be 2 A. In the first bypass mode and in the second bypass mode, the first current I1 and the charging current ICH are both equal to 2 A, whereas, the first voltage V1 and the DC voltage VBUS are both equal to 3.5V (i.e., corresponding to the battery voltage VBAT). In other words, the charging system 1010 operates in a direct charging mode, which indicates that the power delivery unit 100 directly charges the battery 300 by a constant current.

Figure 11:
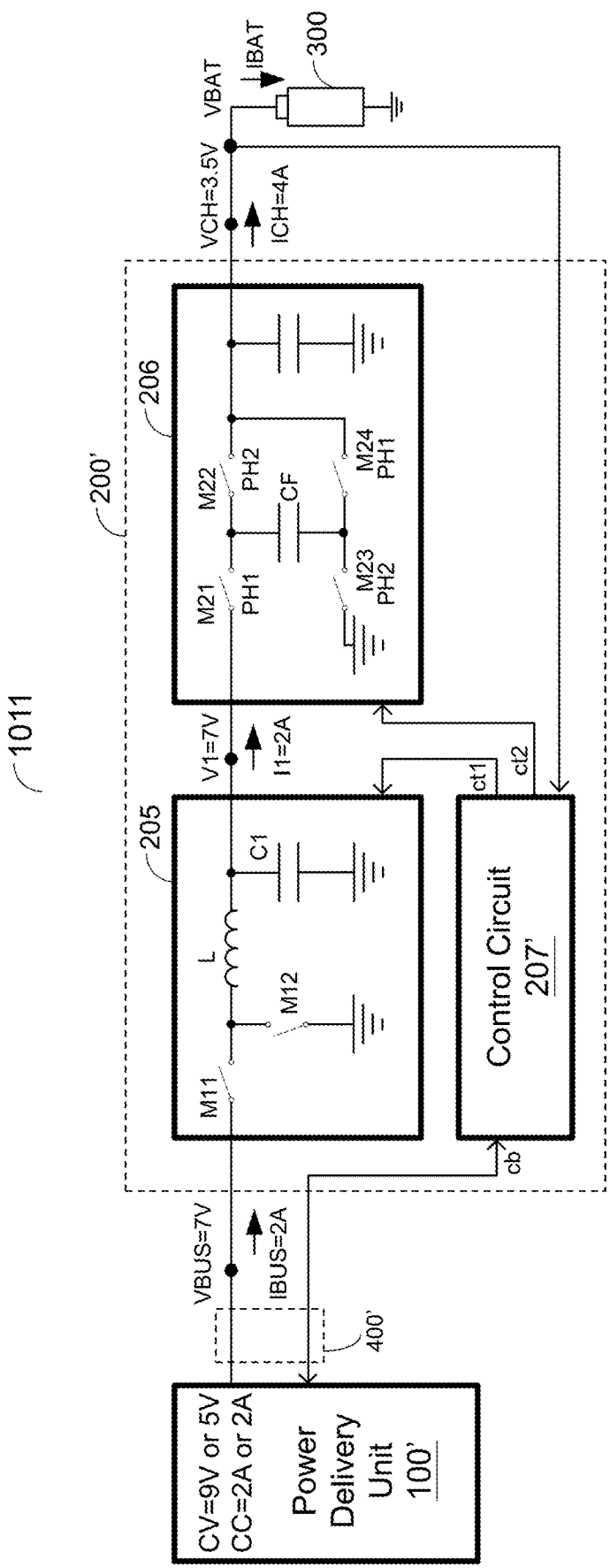
FIG. 11 shows a high efficiency charging system and a power conversion circuit thereof according to still another embodiment of the present invention.

Please refer to FIG. 11, which shows a high efficiency charging system and a power conversion circuit thereof (i.e., charging system 1011 and power conversion circuit 200') according to still another embodiment of the present invention. This embodiment is a derivative of the embodiment of FIG. 4. In this embodiment, the power delivery unit 100 is selectively operable in one of two modes, a low power mode and a high power mode. In the low power mode, the DC voltage VBUS generated from the power delivery unit 100 is for example equal to 5V, whereas, a DC current IBUS generated from the power delivery unit 100 is for example equal to 2 A. In other words, in this case, a maximum power that is outputted from the power delivery unit 100 is equal to 10 W. On the other hand, in the high power mode, the DC voltage VBUS generated from the power delivery unit 100 is for example equal to 9V, whereas, the DC current IBUS generated from the power delivery unit 100 is for example equal to 2 A. In other words, in this case, a maximum power that is outputted from the power delivery unit 100 is equal to 18 W. Besides, in this embodiment, the battery voltage VBAT (corresponding to charging voltage VCH) is for example equal to 3.5V. And, this embodiment can charge the battery 300 by the charging current ICH in a constant current mode. Besides, if the capacitive switching power converter 206 is controlled to operate in the second regulation mode, in a case wherein the current amplification ratio k is equal to two, the first voltage V1 (which is equal to 2-fold of charging voltage VCH) will be equal to 7V. That is, it is required for the DC voltage VBUS to be greater than or equal to 7V.

In this embodiment, as shown in FIG. 11, the control circuit 207 can determine that the inductive switching power converter 205 operates in the first bypass mode and that the capacitive switching power converter 206 operates in the second regulation mode. Besides, the control circuit 207 can instruct the power delivery unit 100 via the above-mentioned communication interface CB to output a constant current and operate in a high power mode. More specifically, in this embodiment, the DC current IBUS generated from the power delivery unit 100 is regulated to be 2 A. In the first bypass mode and in the second regulation mode, the first current I1 and the charging current ICH are equal to 2 A and 4 A, respectively, whereas, the first voltage V1 and the DC voltage VBUS are both equal to 7V (i.e., corresponding to 2-fold of the battery voltage VBAT).

From one perspective, according to the description of the above-mentioned embodiments, the principle for the control circuit 207 to determine whether the inductive switching power converter 205 operates in the first bypass mode or the capacitive switching power converter 206 operates in the second bypass mode can be summarized as below.

In one embodiment, when the DC voltage VBUS of the DC power is lower than a first threshold Vth1, the inductive switching power converter 205 operates in the first bypass mode. In one embodiment, the first threshold Vth1 is correlated with the first voltage V1. In one embodiment, when the capacitive switching power converter 206 operates in the second regulation mode, the first voltage V1 is k-fold of the battery voltage VBAT; thus, in such embodiment, the first threshold Vth1 is correlated with k*VBAT. Additionally, when the capacitive switching power converter 206 operates in the second bypass mode, the first voltage V1 is equal to the battery voltage VBAT. Thus, in one embodiment, the first threshold Vth1 is correlated with the battery voltage VBAT.

More specifically, for example, let it be assumed that a maximum duty ratio under a situation where the inductive switching power converter 205 operates in the first regulation mode is equal to Dmax, in the embodiment wherein the capacitive switching power converter 206 operates in the second regulation mode, the first threshold Vth1 can be derived and represented by following equation:

$$Vth1 = VBAT*k/Dmax,$$

wherein Dmax is a real number greater than or equal to zero and smaller than one.

When the power delivery unit 100 is able to deliver a constant DC current IBUS, as shown by embodiments of FIG. 8 and FIG. 10, the control circuit 207 can selectively control the inductive switching power converter 205 to operate in the first bypass mode. Under such circumstance, as described above, the power conversion efficiency of the charging system can be enhanced.

From another perspective, in one embodiment, when the power delivery unit 100 is able to deliver a constant DC current IBUS, and when the DC voltage VBUS is a variable and can exceed VBAT*k, the control circuit 207 can selectively control the inductive switching power converter 205 to operate in the first bypass mode and control the capacitive switching power converter 206 to operate in the second regulation mode.

On the other hand, when the DC voltage VBUS of the DC power is lower than a second threshold Vth2, the capacitive switching power converter 206 operates in the second bypass mode, wherein the second threshold Vth2 is correlated with the battery voltage VBAT. When the capacitive switching power converter 206 operates in the second regulation mode, the first voltage V1 is equal to k-fold of the battery voltage VBAT, whereas, the DC voltage VBUS is greater than or equal to the first voltage V1. Hence, in one embodiment, the second threshold Vth2 is correlated with k*VBAT. More specifically, in one embodiment, Vth2$k$*VBAT.

Additionally, generally speaking, because the maximum duty ratio is smaller than one, when the inductive switching power converter 205 operates in the first regulation mode, it is required for the DC voltage VBUS to be greater than the first voltage V1. Hence, in one embodiment, the first threshold Vth1 is greater than the second threshold Vth2.

As illustrated by embodiments of FIG. 9 and FIG. 10, when the DC voltage VBUS is too low to fulfill the criteria for the capacitive switching power converter 206 to operate in the second regulation mode, the control circuit 207 can determine the capacitive switching power converter 206 to operate in the second bypass mode.

In light of above, in one embodiment, in a case wherein the inductive switching power converter 205 is configured as a buck switching power converter and in a case wherein the DC voltage VBUS is programmable and the DC voltage VBUS is lower than the first threshold Vth1, the upper gate switch of the switching devices is fully ON, so as to bypass the DC power to the first power.

In one embodiment, when the DC voltage VBUS of the DC power is lower than the second threshold Vth2, a part of switching devices of the switching devices are fully ON, so as to bypass the first power to the charging power.

In one embodiment, the aforementioned control circuit 207 can be for example a microcontroller. Such microcontroller is configured to operably control the DC voltage VBUS of the DC power and/or the DC current IBUS of the DC power via a communication interface.

In addition, based upon the aforementioned combinations of different operation modes, in one embodiment, the control circuit 207 can control the DC voltage VBUS of the DC power and/or the DC current IBUS of the DC power, so that the power conversion circuit 200 operates at a maximum efficiency operation point.

Figure 12:
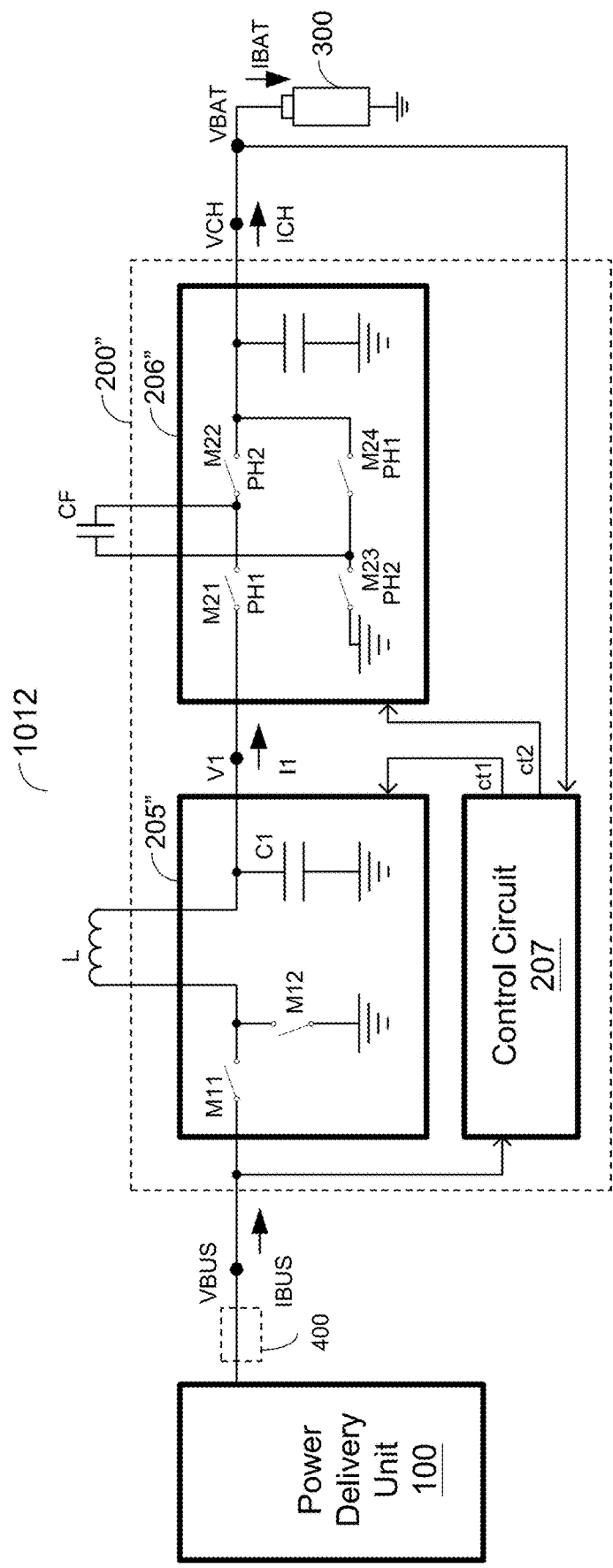
FIG. 12 shows a high efficiency charging system and a power conversion circuit thereof according to still another embodiment of the present invention.

Please refer to FIG. 12, which shows a high efficiency charging system and a power conversion circuit thereof (i.e., charging system 1012 and power conversion circuit 200") according to still another embodiment of the present invention. This embodiment shown in FIG. 12 is similar to the aforementioned embodiments, but is different in that: in this embodiment, the inductor L and the conversion capacitor CF are not included in the power conversion circuit 200". In this variation, the inductive switching power converter 205" is configured to operably switch the inductor L, whereas, the capacitive switching power converter 206" is configured to operably switch the conversion capacitor CF. In one embodiment, the inductive switching power converter 205", the capacitive switching power converter 206" and the control circuit 207 are integrated into an integrated circuit (IC). That is, the power conversion circuit 200" corresponds to the above-mentioned integrated circuit.

The embodiments described above with reference to FIG. 4 to FIG. 5 and FIG. 7 to FIG. 12 adopt the buck type inductive switching power converter and the voltage-divided type capacitive switching power converter to demonstrate how the present invention operates. In other embodiments wherein different types of inductive switching power converter and capacitive switching power converter are used, the multiple k and the above-mentioned threshold can be correspondingly adjusted, depending upon the practical combination of the switching power converters. Those skilled in this art can readily conceive variations and modifications within the spirit of the present invention, so the details thereof are not redundantly explained here.

The present invention proposes a power conversion circuit which includes an inductive switching power converter connected in series to a capacitive switching power converter. The present invention can adaptively select one of different combinations of different operation modes of the inductive switching power converter and the capacitive switching power converter, depending upon different situations of the DC power, the battery voltage and the battery state. As a consequence, the power conversion circuit can operate in a maximum power mode, or operate in a high efficiency mode, or operate at a maximum efficiency operation point, to charge the battery.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion circuit, comprising:
   an inductive switching power converter, includes a plurality of first switching devices configured to operably switch an inductor, so as to convert a DC power to a first power; and
   a capacitive switching power converter, which includes a plurality of second switching devices configured to operably switch a conversion capacitor, so as to convert the first power to a charging power;
   wherein the inductive switching power converter and the capacitive switching power converter are configured to operate in at least one of an operation combination set according to the DC power and the charging power, wherein the operation combination set includes:
   combination I: wherein when a maximum of a DC voltage of the DC power is higher than a DC threshold and when the DC voltage is controlled to be regulated to a predetermined level higher than the DC threshold, the inductive switching power converter is configured to operate in a first regulation mode and the capacitive switching power converter is configured to operate in a second regulation mode, wherein the DC threshold is correlated with a product of the charging voltage of the charging power and a current amplification ratio, wherein the current amplification ratio is a ratio of a charging current of the charging power to a first current of the first power;
   combination II: wherein when the maximum of the DC voltage of the DC power is higher than the DC threshold and when the DC current is controlled to be regulated to a predetermined level, the inductive switching power converter is configured to operate in a first bypass mode and the capacitive switching power converter is configured to operate in the second regulation mode;
   combination III: wherein when the maximum of the DC voltage of the DC power is lower than the DC threshold and when the DC voltage is controlled to be regulated to a predetermined level higher than a charging voltage of the charging power, the inductive switching power converter is configured to operate in the first regulation mode and the capacitive switching power converter is configured to operate in a second bypass mode; and
   combination IV: wherein when the maximum of the DC voltage of the DC power is lower than the DC threshold and when a DC current of the DC power is controlled to be regulated to a predetermined level, the inductive switching power converter is configured to operate in the first bypass mode and the capacitive switching power converter is configured to operate in the second bypass mode;
   wherein in the first regulation mode, the plurality of first switching devices are configured to operably switch the inductor based on a first switching frequency to perform switched inductor-based power conversion, thereby regulating the first power to a first predetermined target level;
   wherein in the second regulation mode, the plurality of second switching devices are configured to operably switch the converter capacitor based on a second switching frequency to perform switched capacitor-based power conversion, thereby regulating the charging power to a second predetermined target level;
   wherein the plurality of first switching devices include at least one first bypass switch, wherein in the first bypass mode, the at least one first bypass switch is controlled to be always ON, thereby bypassing the DC power to the first power;
   wherein the plurality of second switching devices include at least one second bypass switch, wherein in the second bypass mode, the at least one second bypass switch is controlled to be always ON, thereby bypassing the first power to the charging power;
   wherein each of the at least one first bypass switch, in at least one sub-mode of the first regulation mode, is configured to switch the inductor based on operably the first switching frequency, and at least a portion of a current of the inductor flows through the at least one first bypass switch;

wherein each of the at least one second bypass switch, in the second regulation mode, is configured to operably switch the converter capacitor based on the second switching frequency, and at least a portion of a current of the converter capacitor flows through the at least one second bypass switch.

2. The power conversion circuit of claim 1, wherein in combinations I and II, the DC voltage of the DC power is higher than the DC threshold to an extent that a duty ratio of the inductive switching power converter does not exceed a maximum duty ratio under which the inductive switching power converter is operable.

3. The power conversion circuit of claim 1, wherein the inductive switching power converter is configured as a buck switching power converter, wherein the plurality of first switching devices includes an high-side switch, coupled between the DC power and one terminal of the inductor, with the other terminal of the inductor coupled to the first power, wherein the at least one bypass switch is the high-side switch, wherein in the first bypass mode, the high-side switch is controlled to be always ON, thereby bypassing the DC power to the first power through the inductor.

4. The power conversion circuit of claim 1, further comprising:
a control circuit, which is configured to operably control the DC voltage of the DC power and/or the DC current of the DC power via a communication interface, configured to communicating with a power delivery unit which is configured to generate the DC power;
wherein the communication interface is a D+ signal and a D− signal of the USB protocol or the communication interface is a CC1 signal and a CC2 signal of the USB PD protocol.

5. The power conversion circuit of claim 1, further comprising:
a control circuit, which is configured to operably control the DC voltage of the DC power and/or the DC current of the DC power, so that the power conversion circuit operates at a maximum efficiency operation point.

6. A charging system, which is configured to operably convert an input power to a charging power; the charging system comprising:
a power delivery unit, which is configured to operably convert the input power to a DC power; and
a power conversion circuit of claim 1, which is configured to operably convert the DC power to the charging power.

7. The power conversion circuit of claim 1, not comprising a dedicated switch that bypasses the DC power to the first power source without periodically switching the inductor in the first regulation mode, nor comprising a dedicated switch that bypasses the first power source to the charging power source without periodically switching the conversion capacitor in the second regulation mode.

8. The power conversion circuit of claim 1, wherein the DC power is provided from an AC-DC converter.

9. The power conversion circuit of claim 8, wherein the AC-DC converter is an adapter complying with the universal serial bus (USB) power delivery (PD) protocol.

10. The power conversion circuit of claim 1, wherein the capacitive switching power converter is a voltage-divided type capacitive switching power converter.

11. The power conversion circuit of claim 10, wherein a charging voltage of the charging power is ½-fold or ¼-fold of a first voltage of the first power, and wherein a charging current of the charging power is 2-fold or 4-fold of a first current of the first power.

\* \* \* \* \*